(12) United States Patent
Lore et al.

(10) Patent No.: US 11,215,847 B2
(45) Date of Patent: Jan. 4, 2022

(54) ELECTRONIC HINGE FOR SPECTACLE FRAME

(71) Applicant: Essilor International, Charenton-le-Pont (FR)

(72) Inventors: Marie Lore, Charenton-le-Pont (FR); Paul Gil, Charenton-le-Pont (FR); Guillaume Broutin, Charenton-le-Pont (FR); Jean Sahler, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 378 days.

(21) Appl. No.: 16/334,913

(22) PCT Filed: Sep. 15, 2017

(86) PCT No.: PCT/EP2017/073279
§ 371 (c)(1),
(2) Date: Mar. 20, 2019

(87) PCT Pub. No.: WO2018/054778
PCT Pub. Date: Mar. 29, 2018

(65) Prior Publication Data
US 2019/0212584 A1    Jul. 11, 2019

(30) Foreign Application Priority Data

Sep. 22, 2016  (EP) ..................... 16306220

(51) Int. Cl.
*G02C 1/00*     (2006.01)
*G02C 11/00*    (2006.01)
*G02C 5/22*     (2006.01)

(52) U.S. Cl.
CPC ............... *G02C 11/10* (2013.01); *G02C 5/22* (2013.01)

(58) Field of Classification Search
CPC .......... G02C 11/10; G02C 11/04; G02C 5/22; G02C 11/06; G02C 7/061; G02C 7/081; G02C 8/083
(Continued)

(56) References Cited

U.S. PATENT DOCUMENTS 9,442,305 B2 *  9/2016  Blum ..................... G02C 11/10
2009/0296044 A1  12/2009  Howell et al.
(Continued)

FOREIGN PATENT DOCUMENTS

WO  WO 2008/137221 A1  11/2008
WO  WO 2012/068527 A2  5/2012
WO  WO 2013/188805 A2  12/2013

OTHER PUBLICATIONS

International Search Report dated Dec. 20, 2017 in PCT/EP2017/073279 filed on Sep. 15, 2017.
(Continued)

*Primary Examiner* — Hung X Dang
(74) *Attorney, Agent, or Firm* — Oblon, McClelland, Maier & Neustadt, L.L.P.

(57) ABSTRACT

A hinge including a first hinge part and a second hinge part configured to be attached respectively to a first spectacle frame element and a second spectacle frame element, the first hinge part being rotatable relative to the second hinge part, the first hinge part including a first electronic support part supporting at least a first electronic component and a first wire core part extending from the first electronic support part through at least one of the first or second spectacle frame element, the first electronic support part and the first wire core part are embodied in the first hinge part.

11 Claims, 2 Drawing Sheets

(58) Field of Classification Search
USPC .............................. 351/158, 41, 153; 16/228
See application file for complete search history.

(56) References Cited

U.S. PATENT DOCUMENTS

| | | |
|---|---|---|
| 2010/0177277 A1 | 7/2010 | Kokonaski et al. |
| 2012/0133885 A1 | 5/2012 | Howell et al. |
| 2012/0262667 A1 | 10/2012 | Willey |
| 2013/0215374 A1 | 8/2013 | Blum et al. |
| 2013/0278881 A1 | 10/2013 | Kokonaski et al. |
| 2014/0028966 A1 | 1/2014 | Blum et al. |
| 2014/0313473 A1 | 10/2014 | Willey |
| 2015/0253590 A1 | 9/2015 | Howell et al. |
| 2015/0378180 A1 | 12/2015 | Blum et al. |
| 2017/0031181 A1 | 2/2017 | Blum et al. |
| 2017/0075141 A1 | 3/2017 | Blum et al. |
| 2017/0242276 A1 | 8/2017 | Willey |

OTHER PUBLICATIONS

Written Opinion of the International Searching Authority dated Dec. 20, 2017 in PCT/EP2017/073279 filed on Sep. 15, 2017.

* cited by examiner

ELECTRONIC HINGE FOR SPECTACLE FRAME

FIELD OF THE INVENTION

The invention relates to an electronic hinge for spectacle frame and spectacle frame comprising such electronic hinge.

BACKGROUND OF THE INVENTION

Electronic spectacle frames have an important and rapid growth. More and more electronic spectacle frames are being develop with a greater variety of different electronic elements.

Electronic spectacle frame may comprise many different electronic elements such as sensors, displays, active lenses, batteries, processors for local processing and communication devices, and charging devices.

With the growing interest in electronic spectacle frames, it has become important to provide a solution that allows including electronic components in a spectacle frame.

It is now well known to embed electronic elements in the front part or in a temple of a spectacle frame.

However, these implementations are no longer sufficient given the increasing amount of electronic components to be integrated into the spectacle frame.

Therefore, there is a need for a solution allowing to integrate electronic elements into the spectacle frame while being very compact and allowing connection between different part of the spectacle frame having electronic elements.

An aim of the present invention is to propose such solution.

SUMMARY OF THE INVENTION

To this end, the invention proposes a hinge comprising a first hinge part and a second hinge part configured to be attached respectively to a first spectacle frame element and a second spectacle frame element, the first hinge part being rotatable relative to the second hinge part, the first hinge part comprising a first electronic support part supporting at least a first electronic component and a first wire core part extending from the first electronic support part through at least one of the first or second spectacle frame element, the first electronic support and the first wire core part are embodied in the first hinge part.

Advantageously, the hinge for spectacle frame according to the invention provides a solution for integrating electronic elements into the spectacle frame. Furthermore, such hinge allows the connection between different spectacle frame elements of the spectacle frame comprising electronic elements while being very compact. The hinge does not only manage just the wire or the flex between two spectacle frame elements.

According to further embodiments which can be considered alone or in combination:
- the hinge is configured to allow a limited opening rotation angle between the first spectacle frame element and the second spectacle frame element;
- the second hinge part comprises a reinforcement support comprising a second electronic support part supporting at least a second electronic component and a second wire core part extending from the second electronic support part through the second spectacle frame element, the reinforcement support being configured to be embodied in the second spectacle frame element;
- one of the first spectacle frame element and the second spectacle frame element is a spectacle temple and the other of the first spectacle frame element and the second spectacle frame element is a spectacle front part;
- the first electronic component and/or the second electronic element comprises a sensor;
- at least one of the first and the second electronic components comprises a radio wave emitting component;
- at least one of the first and the second hinge parts comprises at least a window arranged to be transparent to light and/or radio waves;
- at least one of the first and the second electronic components comprises a light emitting component, for example a LED and the material of the hinge is at least partly transparent to some wavelengths of light;
- the material of the hinge is at least partly transparent to ultraviolet light and the hinge further comprises a sensor arranged and configured to measure the ultraviolet light;
- the hinge is made by tridimensional printing, laser cutting, matrixing or injection;
- at least one of the first and the second wire core parts is tubular and an electrical wire and/or an optical fiber extends from at least one of the first and the second electronic components trough the tubular wire core part of the hinge.

The invention also relates to a spectacle frame comprising a hinge according to the invention.

BRIEF DESCRIPTION OF THE DRAWINGS

Embodiments of the invention will now be described, by way of examples only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
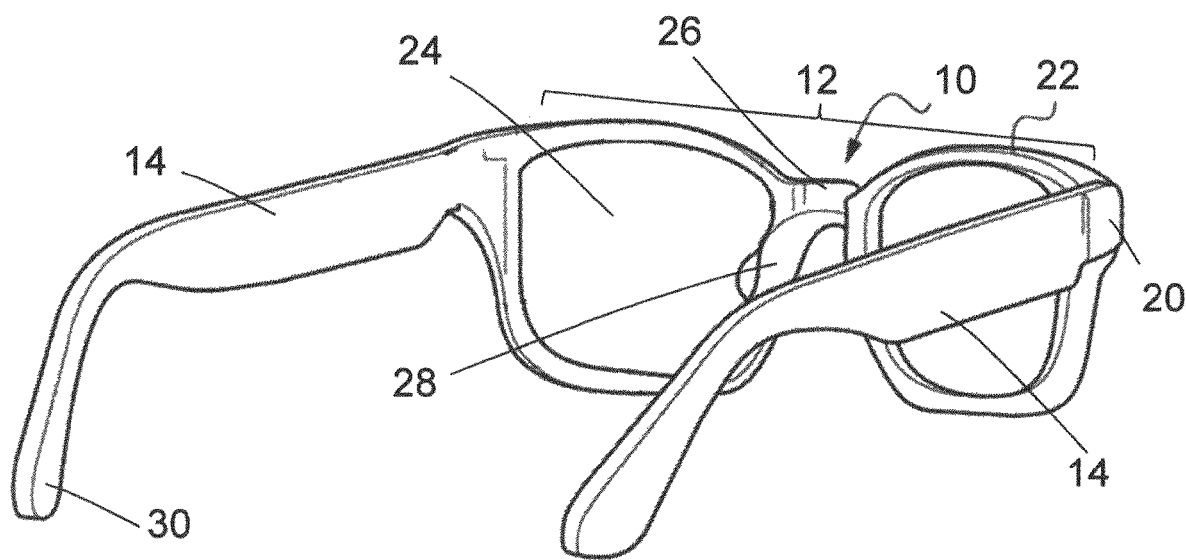
FIG. 1 is a schematic representation of a spectacle frame according to the invention.

FIG. 1 represents an example of a spectacle frame 10 according to the invention. The spectacle frame 10 comprises a front part 12, a first and second temples 14.

The first and second temples 14 are configured to be attached to the front part 12 using hinges and screws. At least one of the first and second temples 14 is configured to be attached to the front part 12 by a hinge 20 according to the invention.

As represented on FIG. 1, the front part 12 may comprise frame rims 22 arranged to receive optical lenses 24, for example ophthalmic lenses. The frame rims are linked by a bridge 26 and may comprise nose pad 28 arranged to rest on the nose of the user when the frame in worn.

The first and second temples may comprise tips 30 arranged to fit around the ears of a user when the frame is being worn by said user.

Figure 2:
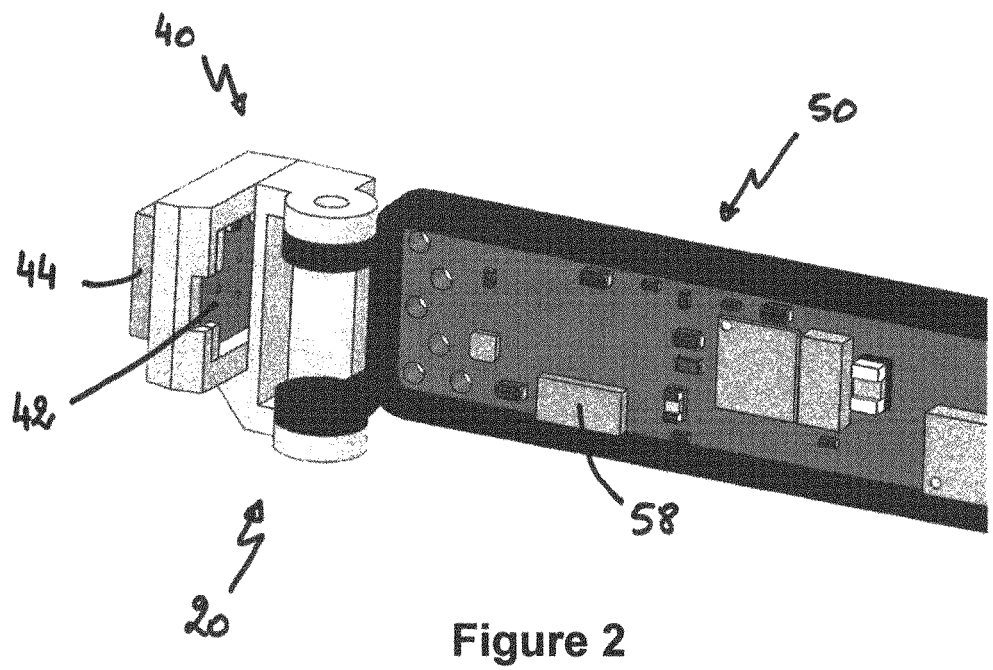
FIGS. 2 and 3 are schematic representations of hinge according to an embodiment of the invention.
Figure 3:
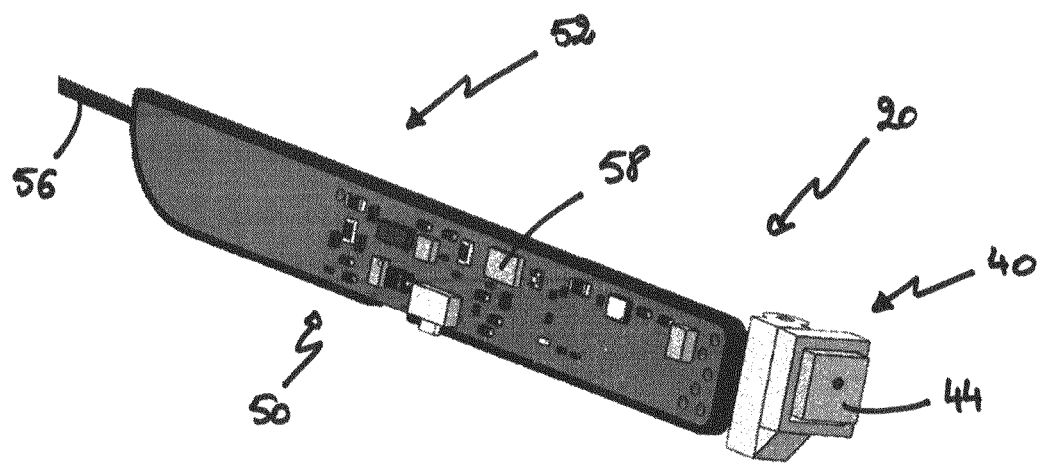

FIGS. 2 and 3 are schematic representation of an embodiment of a hinge 20 comprising a first hinge part 40 and a second hinge part 50 configured to be attached respectively to a first spectacle frame element and a second spectacle frame element.

For example, one of the first spectacle frame element and the second spectacle frame element is a spectacle temple 14 and the other of the first spectacle frame element and the second spectacle frame element is the spectacle front part 12.

The first hinge part 40 is rotatable relative to the second hinge part 42. Preferably, the hinge 20 is configured to allow a limited opening rotation angle between the first spectacle frame element and the second spectacle frame element. Advantageously, the hinge for spectacle frame according to the invention provides a solution for a normal usage of the hinge, i.e. the spectacle frame can be fold up to put it in its transport box.

Furthermore, the first hinge part 40 comprises a first electronic support part 42 supporting at least a first electronic component 44 and a first wire core part (not illustrated) extending from the first electronic support part 42 through at least one of the first or second spectacle frame element.

The first electronic support part 42 and the first wire core part are embodied in the first hinge part 40.

Preferably, the first wire core part of the hinge may be tubular and electrical wire(s) and/or optical fiber(s) may extend from the first electronic component trough the tubular wire core part of the hinge.

The hinge may be made of plastic material, for example of cellulose acetate. Preferably, the hinge is further adapted to the needs of heat dissipation of electronic components.

The first electronic component may typically be a printed circuit board (PCB) comprising electronic elements or a battery.

For example, the first electronic component comprises a sensor 44.

For another example, the first electronic component comprises a radio wave emitting component, typically adapted for Bluetooth communication.

The first electronic component may comprise a light emitting component, for example a LED. According to such embodiment the material of the first hinge part is preferably at least partly transparent to some wavelengths of light so as to allow the light emitted by the first electronic component to be seen.

According to another example compatible with the previous ones, the material of the hinge is advantageously at least partly transparent to ultraviolet light and the hinge further comprises a sensor arranged and configured to measure the ultraviolet light.

According to a preferred embodiment illustrated on FIGS. 2 to 5, the second hinge part 50 further comprises a reinforcement support 52 to provide rigidity to the spectacle frame element 14.

Figure 4:
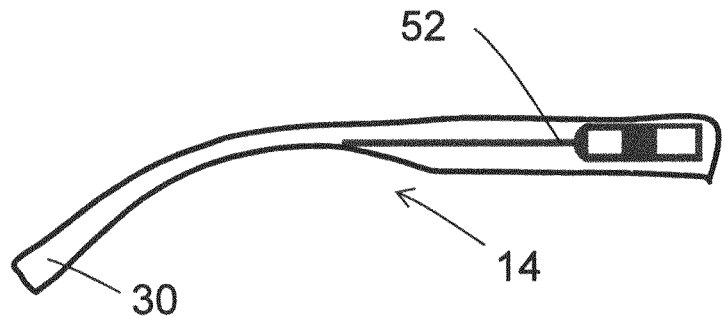
FIG. 4 is a schematic representation of a reinforcement support of the hinge of FIGS. 2 and 3 embodied in a spectacle frame temple according to the invention.

The spectacle frame element represented on FIG. 4 is a spectacle frame temple. The spectacle frame element may be made of plastic material. One of the most used plastic material for spectacle frame is cellulose acetate.

Preferably, the reinforcement support 52 is further adapted to the needs of heat dissipation of electronic components. To this end, the reinforcement support is preferably made of a heat conducting material. Typically, the reinforcement support may be made of a metallic material, such as stainless steel, aluminium, of thermally conductive plastics.

As illustrated on FIG. 3, the reinforcement support 52 used to reinforce the spectacle frame element of the invention, comprises a second electronic support part 54 and a second wire core part 56. The reinforcement support 52 more particularly the second electronic support part 54 and the second wire core part 56 are configured to be embodied in the second spectacle frame element 14.

The electronic support part 54 is configured to support at least a second electronic component 58.

The electronic component 58 may typically be a printed circuit board (PCB) comprising electronic elements or a battery.

For example, the second electronic component comprises a radio wave emitting component, typically adapted for Bluetooth communication.

The second electronic component may comprise a light emitting component, for example a LED. According to such embodiment the material of the spectacle frame element is preferably at least partly transparent to light so as to allow the light emitted by the electronic component to be seen.

Figure 5:
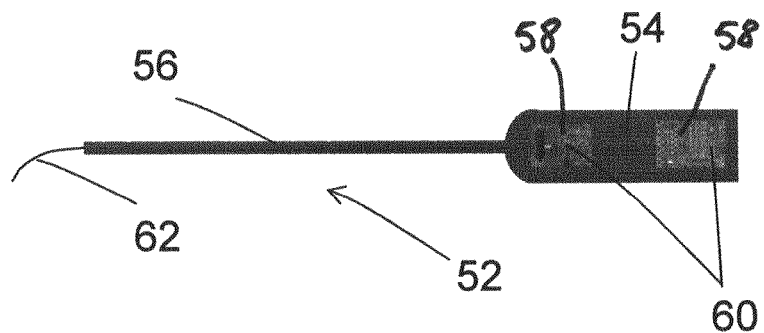
FIG. 5 is a schematic representation of the reinforcement support of FIG. 4 intended to be embodied in a spectacle frame temple according to the invention.

In the example represented on FIG. 5, the second electronic support part 54 comprises two windows 60. The windows 60 may be arranged to be transparent to some wavelengths of light and/or radio waves, for example such windows are through. Advantageously, such electronic support is better adapted when the electronic component is a radio wave or light emitting component.

The second wire core part 56 of the reinforcement support 52 extends from the second electronic support part 54 through the second spectacle frame element 14.

The second wire core part 56 of the reinforcement support 52 typically extends along at least 50% of the length of the spectacle temple, for example at least 75% so as to increase the rigidity of the spectacle temple.

As represented on FIG. 5, the second wire core part 56 of the reinforcement support 52 may be tubular and electrical wire(s) 62 and/or optical fiber(s) may extend from the electronic component trough the tubular wire core part of the reinforcement support.

Advantageously, the hinge according to the invention may be made by tridimensional printing, laser cutting, matrixing or injection and allows integrating electronic component in the hinge of the spectacle frame while being compact.

The hinge according to the invention allows the connection with wires, flex or different electronic connections while minimizing the constraints of the hinge and the electronic on the design of the spectacle frame.

Furthermore, the hinge according to the invention assuring heat dissipation from electronic components improving reliability, comfort and prevent premature failure of the electronic components.

A spectacle frame according to the invention may be used for ophthalmic or solar visual equipment.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A hinge comprising a first hinge part and a second hinge part configured to be attached respectively to a first spectacle frame element and a second spectacle frame element, the first hinge part being rotatable relative to the second hinge part, the first hinge part comprising a first electronic support part supporting at least a first electronic component and a first wire core part extending from the first electronic support part through at least one of the first or second spectacle frame element, the first electronic support part and the first wire core part are embodied in the first hinge part, and wherein the second hinge part comprises a reinforcement support comprising a second electronic support part supporting at least a second electronic component and a second wire core part extending from the second electronic support part through the second spectacle frame element, the reinforcement support being configured to be embodied in the second spectacle frame element.

2. The hinge according to claim 1, wherein the hinge is configured to allow a limited opening rotation angle between the first spectacle frame element and the second spectacle frame element.

3. The hinge according to claim 1, wherein one of the first spectacle frame element and the second spectacle frame element is a spectacle temple and the other of the first spectacle frame element and the second spectacle frame element is a spectacle front part.

4. The hinge according to claim 1, wherein the first electronic component and/or the second electronic element comprises a sensor.

5. The hinge according to claim 1, wherein at least one of the first electronic component and/or the second electronic element comprises a radio wave emitting component.

6. The hinge according to claim 1, wherein at least one of the first and the second hinge parts comprises at least a window arranged to be transparent to light and/or radio waves.

7. The hinge according to claim 1, wherein at least one of the first and the second electronic components comprises a light emitting component, for example a LED and the material of the hinge is at least partly transparent to some wavelengths of light.

8. The hinge according to claim 1, wherein the material of the hinge is at least partly transparent to ultraviolet light and the hinge further comprises a sensor arranged and configured to measure the ultraviolet light.

9. The hinge according to claim 1, wherein the hinge is made by tridimensional printing, laser cutting, matrixing or injection.

10. The hinge according to claim 1, wherein at least one of the first and the second wire core parts is tubular and an electrical wire and/or an optical fiber extends from at least one of the first and the second electronic components through the tubular wire core part of the hinge.

11. A spectacle frame comprising a hinge according to claim 1.

* * * * *